Patented Oct. 30, 1951

2,573,423

UNITED STATES PATENT OFFICE 2,573,423

WAX PRODUCTS AND PREPARATION THEREOF

John J. Fish, New York, N. Y., assignor to Sun Chemical Corporation, New York, N. Y., a corporation of Delaware No Drawing. Application February 21, 1948, Serial No. 10,182

8 Claims. (Cl. 106—245)

This invention relates to wax materials obtained from hydrocarbon sources, and to a process for obtaining such wax materials.

One object of the present invention is to provide treated wax materials with superior characteristics in use as compared to hitherto available wax materials.

Another object of the present invention is to provide wax materials by subjecting hydrocarbons to successive chemical operations which result in the production of products with improved characteristics.

Another object of the present invention is to provide wax materials from hydrocarbon sources by subjecting such hydrocarbons to successive chemical and physical operations to provide wax products which have superior characteristics as compared to hitherto available commercial waxes.

Another object of the present invention is to provide, from hydrocarbon sources, wax materials which are characterized by their ability to form stable emulsions in water of good leveling properties and, which produce upon drying of such emulsions, films having an extremely high gloss.

Other objects of the present invention will be apparent from the description and appended claims.

In my copending patent application Serial Number 736,615, filed March 27, 1947, I have described a procedure whereby the residue remaining after the fractionation of the petroleum storage residues or so-called tank bottoms of a wax-containing crude oil, preferably a petroleum oil secured from the Oklahoma and East Texas oil fields, is treated with sulfuric acid to effect precipitation and removal of asphalts, asphaltenes and other materials which are removed by such acid treatment, which thereafter is neutralized with alkali or similar material, and after treatment with a material such as fuller's earth to effect further separation of suspended and colored impurities is subsequently distilled to separate as fractions thereof the liquid hydrocarbon materials present, and as a residue, a dark amber wax material.

The wax material at such stage of operation generally contains a fairly high proportion of materials which are normally liquid at normal room temperatures. To effect separation of such material from the wax satisfactorily there is utilized a solvent extraction process, in which the wax-containing material is admixed with a solvent or mixture of solvents which is a good solvent for the liquid hydrocarbon materials present, but a relatively poor solvent for the wax materials. By such operations, the wax materials present in such mixture may be separated from the normally liquid hydrocarbons present and obtained as a separate product.

The wax which is secured as a result of such solvent extraction operation, according to the present invention, subsequently is reacted with an oxygen-containing gas under conditions as hereinafter set out to effect change of the wax material and to provide a converted wax with the superior characteristics of the present invention.

The steps prior to the oxidation reaction, as heretofore set out, may be accomplished in different sequence, and where desirable, by other methods. For example, in place of solvent extraction it might be desirable in some instances to effect separation of the wax material from liquid hydrocarbons contained therewith by methods such as distillation. Also, the previously described acid treatment may be varied, depending upon the crude oil which is utilized. The bleaching operations likewise may be effected with materials of the general characteristics of fuller's earth material, or where unnecessary, may be eliminated. It has been found in the present invention that the sequential steps described in connection with the source materials employed lead to an extremely useful product.

I have found in the present invention that by subjecting wax materials, derived from such sources as hereinbefore set forth, to treatment with an oxygen-containing gas at a temperature of at least 270° F. but below the temperature at which decomposition of the said wax material occurs, and in the presence of a polymerized hydrocarbon material, a chlorinated hydrocarbon material, an oxidation catalyst and a material selected from the group consisting of drying oils, blown drying oils, semi-drying oils, blown semi-drying oils and mixtures thereof, wax materials are produced which are characterized by the property of forming stable emulsions in water, which emulsions upon drying as films exhibit good leveling properties and extremely high gloss.

The following examples are given illustrative of successful commercial operations according to the present invention.

Example 1

The wax material which is obtained as a residue resulting from the distillation of acid treated, alkali neutralized, asphalt-free petroleum storage residues as hereinbefore set out, is charged to an extraction unit and admixed with a mixture of methyl ethyl ketone and benzol. Satisfactorily there may be utilized a mixture consisting of 70 per cent of the ketone and 30 per cent of benzol by weight. The ratio of wax to mixed solvent satisfactorily is maintained at 1:3. Initially, the mixture is warmed to a temperature slightly in excess of 200° F., for example 215-220° F., to secure complete solution of the materials present. Subsequently, the admixed materials are passed to a chilling unit and are chilled under agitation conditions. Upon such chilling operations, a wax material separates from the mixed solvent in the form of a substantially oil-free wax.

Example 2

Wax material obtained as described in Example 1 is placed in a reaction vessel, and the reaction vessel heated until the temperature of the wax is about 240° F. At this point 1-10 per cent by weight of polyethylene, based upon the weight of the wax material, is incorporated into the melted wax under mechanical agitation conditions and the admixture heated to about 290° F., which in practical operations may be accomplished by maintaining the reaction vessel in contact with a heating means such as a heated oil bath or steam bath. An oxygen-containing gas then is introduced into the admixture which satisfactorily may be effected through a distributor device for such gas located at the bottom of the reaction vessel, the distributor device being connected to a compressor for furnishing the required amount of such gas. Normally, the passage through the wax admixture of the oxygen-containing gas effects sufficient agitation of the material so that no additional agitation is required. The rate of flow of the oxygen containing gas, where air is used as such gas, satisfactorily is about 1.7 cubic feet per hour per pound of wax. After the flow of oxygen-containing gas through the wax admixture has been started, there are incorporated into the wax admixture in turn, 0.3-1 per cent by weight of chlorinated paraffin, said chlorinated paraffin having a high chlorine content, about 0.5 per cent by weight manganese stearate and about 0.5 per cent by weight raw or blown linseed oil, the percentage of the said materials added being based upon the weight of the wax material. The heat of reaction during the oxidation period is satisfactorily maintained below 300° F. in the temperature range of 290-300° F. by the utilization of controlling means such as a cooling coil immersed in the wax admixture. The admixture is maintained at such temperature until the oxidation reaction is completed, as hereinafter described.

The product obtained as described in Example 2 has a penetration value below 7, a melting point of approximately 192-196° F., an acid number of not less than 12, and a ratio of saponification number to acid number of at least 3 to 1, and exhibits the characteristics of forming stable emulsions with water, which emulsions upon drying as films show extremely good leveling properties and high gloss.

In connection with the penetration value mentioned above, these values refer to penetration determined according to the A. S. T. M. method D-5-25, published by the American Society for Testing Materials. The conditions under which all penetration values were determined in the present specification was with a load of 100 grams for a period of 5 seconds at a temperature of 25° C., and the units of penetration indicate hundredths of a centimeter. These are the standard conditions set forth in the above designated A. S. T. M. method.

Products obtained according to the procedure as outlined in Example 2 as set forth above exhibit unusual properties of forming stable colloidal dispersions in water, which dispersions, or emulsions as they are commonly designated in the industry, upon drying as films exhibit good leveling properties and extremely high gloss ordinarily found only in films from materials such as carnauba wax.

The foregoing illustrative examples described a method of procedure in which the source of hydrocarbon material comprises tank bottoms secured upon the settling of crude petroleum oils. In the practicing of the present invention other hydrocarbon materials also may be utilized, and products obtained which show the improved characteristics of the present invention. For example, satisfactory source materials include waxy materials separated from petroleum during the preparation of lubricating oil fractions, and other microcrystalline waxes obtained in the refining of petroleum, and also mixtures consisting predominantly of hydrocarbons solid at normal room temperatures and resulting from the reaction of carbon monoxide and hydrogen according to the well known Fischer-Tropsch synthesis. The particular source of the hydrocarbon is not critical, it being desirable only that a material be employed which consists predominantly of hydrocarbons solid at normal room temperature.

The incorporation of a polymerized hydrocarbon material into such wax materials as are described above and in the manner set forth in the present invention greatly increases the smoothness, hardness and melting point of the wax materials so treated. These properties are reflected in the films formed from emulsions containing the wax materials of the present invention, giving to such films a smooth, tough and highly glossy finish. Depending upon the percentage of the particular polymerized hydrocarbon material employed in carrying out my invention, penetration values of ½ to 1, as determined according to the A. S. T. M. method D-5-25, may be obtained. Another desirable feature of the presence of such a polymerized hydrocarbon material, as for example polyethylene, in the treated wax materials of the present invention is the ability of the said polymerized hydrocarbon material to prevent crystallization of the treated wax material.

In place of the polyethylene utilized in the example set forth above there may satisfactorily be substituted polymers of other unsaturated hydrocarbons, to obtain products having the same desirable qualities as have the wax materials obtained from the procedure outlined in Example 2. Examples of some such polymers of unsaturated hydrocarbons are polypropylene, polybutene, and generally, the polymers of other alkylene hydrocarbons. Similarly, polystyrene may be utilized in place of polyethylene in the procedure as outlined in the present invention to yield products having the same desirable characteristics.

In illustrative Example 2 utilization of manganese stearate and blown linseed oil during the oxidation step has been described. Other materials may be utilized in place of these, while still obtaining the desirable products of the present invention. For example, in place of manganese stearate, copper stearate, cobalt stearate, ferric stearate, aluminum stearate, aluminum linoleate, and other manganese or cobalt salts may be utilized. In place of the blown linseed oil any drying or semi-drying oil may be employed. In some instances it may be satisfactory to employ in place of both materials, a single compound. Thus, instead of the stearate and blown linseed oil or peroxide, there may be employed a compound such as methyl oleate or methyl linoleate.

It has been found that a ratio of saponification number to acid number of at least 3 to 1 in the products of the present invention, coupled with a penetration value of less than approximately 7, are properties essential to these wax materials in order that they may exhibit the characteristics of forming stable emulsions with water, which upon drying as films have an increased hardness as compared to films formed from hitherto available wax materials and high gloss. When the ratio of saponification number to acid number falls below the ratio of 3 to 1, these characteristics are generally impaired. One explanation which may be set forth to explain such behavior may be found in an analysis of the reactions occurring during the oxidation of the wax admixture. During the oxidation, it may be assumed that two reactions predominantly are occurring, one resulting in the formation of acid material and alcohol material, and the other resulting in the formation of esters by interaction of the alcohols and acids secured. When the reaction resulting in the formation of esters has predominated over the reaction resulting in the formation of acids, as is shown by the high saponification number and low acid value of the end product, the resulting product generally possesses the desirable characteristics of the present invention. When the acid value of the end product rises with a corresponding decrease in the saponification number, the reaction products are found to have lost to a great extent or almost entirely the desired characteristics mentioned above. Therefore, it may be assumed that the formation of esters during the oxidation reaction in preference to the formation of acids is controlling with reference to the gloss properties of the resulting product.

Normally, however, oxidation reactions are more rapid than esterification reactions and ordinarily it would be expected that in the oxidation reaction outlined in the present invention the formation of acids would be so predominant as to counterbalance the ester formation and thus reduce the ratio of saponification number to acid number. It has been found, however, that the incorporation of a chlorinated hydrocarbon material such as chlorinated paraffin or a chlorinated product of a relatively high boiling liquid hydrocarbon at the beginning of the oxidation reaction has a catalytic effect upon the formation of esters and a retarding effect upon the formation of acids in the reaction as outlined in Example 2, leading to the formation of products exhibiting the desirable characteristics of the present invention.

Another advantage which is obtained in the utilization of such a chlorinated hydrocarbon material lies in the fact that the reaction sequence can be effected at a substantially lower temperature than when the chlorinated hydrocarbon material is absent, thereby resulting in a more efficient and economical process. By effecting the oxidation reaction at such lower temperatures there is also no danger of cracking or decomposition of the hydrocarbon materials employed in the reaction.

In the oxidation reaction, one satisfactory method of determining completion of this reaction according to the present invention consists in withdrawing samples of the wax material from the reaction vessel at intervals, and using such wax material to prepare a standard emulsion. When an emulsion is obtained which is stable, and which upon drying as a film shows good leveling properties and high gloss, the reaction step may be discontinued by shutting off the supply of oxygen-containing gas and allowing the mixture to cool. A satisfactory formula for such emulsion to determine when reaction is completed is as follows: Treated wax, 40 parts; stearic acid, 4 parts; morpholine, 3 parts; ammonia 26 Bé., 10 parts; and water, 236 parts. The wax and stearic acid are melted at 95° C. and the morpholine stirred in until a clear solution is secured. Small portions of the ammonia, diluted with 30 parts of hot water, are added slowly under stirring and in small portions, each new portion being added only after the previous one has been completely incorporated. The remaining water, at a temperature near its boiling point, is added slowly until the jelly-like emulsion which first forms becomes liquid, at which point the remainder of the water is added at once. Instead of stearic acid, oleic or other high molecular weight fatty acid may be employed. Instead of morpholine, other alkaline material such as triethanolamine may be utilized.

In some instances it is necessary to vary the above formula slightly to secure a satisfactory emulsion exhibiting the desirable leveling properties and gloss. Such formula is as follows: Treated wax, 40 parts; stearic acid, 8 parts; morpholine, 5 parts; water, 240 parts. This emulsion is prepared in the same manner as the emulsion previously described. In the case of the above oxidation reaction, it may be necessary to prepare both emulsions with samples withdrawn at intervals to determine when the reaction sequence is completed.

The above test, while admittedly empirical, furnishes a satisfactory indication of the end point of the reaction and for practical purposes in commercial operations is extremely satisfactory.

The wax products of the present invention may satisfactorily be utilized in so-called non-rub floor polishes. One satisfactory polish is prepared containing the following ingredients: Treated wax of the present invention, 7.5 parts; microcrystalline wax, 2.65 parts; stearic acid, 2.5 parts, triethanolamine, 1.7 parts; borax, 0.3 part; shellac, 2.0 parts; water, 83.35 parts. The proportions of the above ingredients may be varied somewhat, and the fatty acid and alkaline material may be replaced by analogous acids and alkaline substances. Also, the shellac may be replaced by other hard film forming resinous materials.

Such polishes, when poured in films upon surfaces such as linoleum, show extremely good leveling properties, and upon drying furnish extremely hard, glossy films without necessity for any buffing or polishing operation.

While the products herein described and processes of making the same constitute preferred embodiments of the invention, changes may be made therein without departing from the scope of the invention as defined in the appended claims.

What is claimed is:

1. A wax composition characterized by the property of forming stable emulsions in water, which emulsions upon drying, form highly glossy films, comprising the product obtained by subjecting a hydrocarbon wax material comprising predominantly hydrocarbons solid at normal room temperatures to treatment with an oxygen-containing gas, at a temperature of at least 270° F., but below the temperature at which decomposition of the said wax material occurs, in the presence of 1–10% by weight of a polymerized lower alkylene hydrocarbon material, 0.3 to 1.0% by weight of chlorinated paraffin, an oxidation catalyst and about 0.5% by weight of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material, said wax composition having an acid number of not less than 12, a ratio of saponification number to acid number of at least 3 to 1, a melting point of approximately 192 to 196° F., and a penetration value below 7.

2. A wax composition characterized by the property of forming stable emulsions in water, which emulsions upon drying, form highly glossy films comprising the product obtained by subjecting a substantially oil-free refined wax material obtained from a petroleum storage residue to treatment with an oxygen-containing gas, at a temperature of at least 270° F. but below the temperature at which decomposition of the said material occurs, in the presence of 1 to 10% by weight of a polymerized lower alkylene hydrocarbon material, 0.3 to 1.0% by weight of chlorinated paraffin, an oxidation catalyst and about 0.5% by weight of a material selected from the group consisting of drying oils, blown drying oils, semi-drying oils, blown semi-drying oils, and mixtures thereof. said oxygen containing gas being introduced at the rate of approximately 1.7 cu. ft. per hour per pound of said wax material, said wax composition having an acid number of not less than 12, the ratio of saponification number to acid number of at least 3 to 1, a melting point of approximately 192 to 1960° F., and a penetration value below 7.

3. A wax composition characterized by the property of forming stable emulsions in water, which emulsions upon drying, from highly glossy films, comprising the product obtained by subjecting a substantially oil-free refined wax material obtained from a petroleum storage residue to treatment with an oxygen-containing gas, at a temperature of at least 270° F. but below the temperature at which decomposition of the said wax material occurs, in the presence of 1 to 10% by weight of polyethylene, 0.3 to 1.0% by weight of chlorinated paraffin, an oxidation catalyst and about 0.5% by weight of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material, said wax composition having an acid number of not less than 12, a ratio of saponification number to acid number of at least 3 to 1, a melting point of approximately 192–196° F. and a penetration value below 7.

4. A wax composition characterized by the property of forming stable emulsions in water, which emulsions upon drying, form highly glossy films, comprising the product obtained by subjecting a substantially oil-free refined wax material obtained from a petroleum storage residue to treatment with an oxygen-containing gas, at a temperature of at least 270° F., but below the temperature at which decomposition of the said wax material occurs, the presence of 1 to 10% by weight of polystyrene, 0.3 to 1.0% by weight of chlorinated paraffin, an oxidation catalyst and about 0.5% by weight of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material, said wax composition having an acid number of not less than 12, a ratio of saponification number to acid number of at least 3 to 1, a melting point of approximately 192 to 196° F., and a penetration value below 7.

5. The process which comprises treatment of a hydrocarbon wax material comprising predominantly hydrocarbons solid at normal room temperatures with an oxygen-containing gas at a temperature of at least 270° F. but below the temperature at which decomposition of the said wax material occurs, in the presence of 1 to 10% by weight of a polymerized lower alkylene hydrocarbon material, 0.3 to 1.0% by weight of chlorinated paraffin, an oxidation catalyst and about 0.5% by weight of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material until a wax composition is obtained which is characterized by the property of forming stable emulsions in water, which emulsions upon drying form highly glossy films, said wax composition having an acid number of not less than 12, a ratio of saponification number to acid number of at least 3 to 1, a melting point of approximately 192 to 196° F., and a penetration value below 7.

6. The process which comprises treatment of a substantially oil-free refined wax material obtained from the petroleum storage residue with an oxygen-containing gas at a temperature of at least 270° F. but below the temperature at which decomposition of the said wax material occurs, in the presence of 1 to 10% by weight of a polymerized lower alkylene hydrocarbon material, 0.3 to 1.0% by weight of chlorinated paraffin, an oxidation catalyst and about 0.5% by weight of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material until a wax composition is obtained which is characterized by the property of forming stable emulsions in water, which emulsions upon drying form highly glossy films, said wax composition having an acid number of not less than 12, a ratio of saponification number to acid number of at least 3 to 1, a melting point of approximately 192 to 196° F., and a penetration value below 7.

7. The process which comprises treatment of a substantially oil-free refined wax material obtained from a petroleum storage residue with an oxygen-containing gas at a temperature of at least 270° F. but below the temperature at which decomposition of the said wax material occurs, in the presence of 1 to 10% by weight of polyethylene, 0.3 to 1.0% by weight of chlorinated paraffin, an oxidation catalyst and about 0.5% by weight of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material until a wax composition is obtained which is characterized by the property of forming stable emulsions in water and which has an acid number of not less than 12, a ratio of saponification number to acid number of at least 3 to 1, a melting point of approximately 192 to 196° F., and a penetration value below 7.

8. The process which comprises treatment of a substantially oil-free refined wax material obtained from a petroleum storage residue with an oxygen-containing gas at a temperature of at least 270° F. but below the temperature at which decomposition of the said wax material occurs, in the presence of 1 to 10% by weight of polystyrene, 0.3 to 1.0% by weight of chlorinated paraffin, an oxidation catalyst and about 0.5% by weight of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material until a wax composition is obtained which is characterized by the property of forming stable emulsions in water and which has an acid number of not less than 12, a ratio of saponification number to acid number of at least 3 to 1, a melting point of approximately 192 to 196° F., and a penetration value below 7.

JOHN J. FISH.

REFERENCES CITED

The following references are of record in the file of this patent:

UNITED STATES PATENTS

| Number | Name | Date |
| --- | --- | --- |
| 1,780,632 | Pungs | Nov. 4, 1930 |
| 2,199,933 | Gay | May 7, 1940 |
| 2,282,375 | Padgett | May 12, 1942 |
| 2,349,326 | Wilson | May 23, 1944 |
| 2,424,671 | Stossell | July 29, 1947 |